United States Patent
Jin et al.

(10) Patent No.: US 10,602,536 B2
(45) Date of Patent: Mar. 24, 2020

(54) BEACON-AWARE CO-EXISTENCE IN SHARED SPECTRUM

(71) Applicant: QUALCOMM Incorporated, San Diego, CA (US)

(72) Inventors: Zhong Yi Jin, San Diego, CA (US); Yanjun Sun, San Diego, CA (US); Nachiappan Valliappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 14/849,486

(22) Filed: Sep. 9, 2015

(65) Prior Publication Data

US 2017/0071011 A1  Mar. 9, 2017

(51) Int. Cl.
| | |
|---|---|
| *H04W 72/12* | (2009.01) |
| *H04L 5/00* | (2006.01) |
| *H04W 84/04* | (2009.01) |
| *H04W 84/12* | (2009.01) |
| *H04W 88/10* | (2009.01) |

(52) U.S. Cl.
CPC ....... *H04W 72/1289* (2013.01); *H04L 5/0005* (2013.01); *H04W 72/1215* (2013.01); *H04W 72/1263* (2013.01); *H04W 84/042* (2013.01); *H04W 84/12* (2013.01); *H04W 88/10* (2013.01)

(58) Field of Classification Search
CPC ......... H04W 72/1289; H04W 72/1215; H04W 72/1263; H04L 5/0005
See application file for complete search history.

(56) References Cited

U.S. PATENT DOCUMENTS

| 8,750,926 B2 | 6/2014 | Fu et al. |
| 9,872,307 B2* | 1/2018 | Zhang .............. H04W 72/1215 |
| 2012/0040620 A1* | 2/2012 | Fu ........................ H04B 1/1027 455/63.1 |
| 2012/0113844 A1* | 5/2012 | Krishnamurthy ..... H04L 1/0026 370/252 |
| 2012/0164948 A1 | 6/2012 | Narasimha et al. |
| 2013/0034004 A1* | 2/2013 | Mannemala ...... H04W 52/0216 370/252 |
| 2013/0083712 A1 | 4/2013 | Sadek et al. |

(Continued)

OTHER PUBLICATIONS

Intel Corporation (UK) Ltd: "TDM Solutions for In-Device Coexistence", 3GPP Draft; R2-105666, 3rd Generation Partnership Project (3GPP), Mobile Competence Centre ; 650, Route Des Lucioles;F-06921 Sophia-Antipolis Cedex;France, vol. RAN WG2, No. Xi'an; Oct. 11, 2010, Oct. 5, 2010 (Oct. 5, 2010), XP050452677, [retrieved on Oct. 5, 2010] *chapter 2, "TDM Solutions"*.
International Search Report and Written Opinion—PCT/US2016/050311—ISA/EPO—dated Dec. 14, 2016.

(Continued)

*Primary Examiner* — Shripal K Khajuria
(74) *Attorney, Agent, or Firm* — Muncy, Geissler, Olds & Lowe, P.C.

(57) ABSTRACT

Techniques for managing operation over a communication medium shared between Radio Access Technologies (RATs) are disclosed. In one example, one or more parameters of a Time Division Multiplexed (TDM) communication pattern may be set based on a utilization metric and a beacon schedule. In another example, subframe puncturing on the medium may be scheduled based on the beacon schedule.

30 Claims, 12 Drawing Sheets

(56) References Cited

U.S. PATENT DOCUMENTS

| | | | |
|---|---|---|---|
| 2013/0279381 A1* | 10/2013 | Sampath | H04W 48/08 370/311 |
| 2013/0287014 A1 | 10/2013 | Yuk et al. | |
| 2014/0269628 A1 | 9/2014 | Ghosh et al. | |
| 2014/0293973 A1 | 10/2014 | Lin et al. | |
| 2015/0181620 A1* | 6/2015 | Seok | H04W 74/08 370/311 |
| 2015/0195849 A1* | 7/2015 | Bashar | H04W 16/14 370/330 |
| 2015/0223075 A1* | 8/2015 | Bashar | H04W 16/14 370/329 |
| 2015/0236782 A1* | 8/2015 | Kadous | H04B 7/2643 370/337 |
| 2016/0330011 A1* | 11/2016 | Lee | H04L 5/0066 |

OTHER PUBLICATIONS

Renesas Mobile Europe Ltd: "Enhanced Solution for WiFi Beacon Handling," 3GPP Draft; R2-120573 Enhanced Solution for WIFI Beacon Handling, 3rd Generation Partnership Project (3GPP), Mobile Competence Centre; 650, Route Des Lucioles;F-06921 Sophia-Antipolis Cedex ; France, vol. RAN WG2, No. Dresden, Germany; Feb. 6, 2012-Feb. 10, 2012, Jan. 30, 2012 (Jan. 30, 2012), XP050565182, [retrieved on Jan. 30, 2012] paragraph [0002]-paragraph [0003], 2 pages.

Samsung: "Possible TDM Solution for LTE, WiFi and BT In-device Coexistence", 3GPP DRAFT; R2-105572, 3rd Generation Partnership Project (3GPP), Mobile Competence Centre; 650, Route Des Lucioles; F-06921 Sophia-Antipolis Cedex; France, vol. RAN WG2, No. Xi'an; Oct. 11, 2010, Oct. 15, 2010 (Oct. 5, 2010), pp. 1-5, XP050452632, [retrieved on Oct. 5, 2010].

* cited by examiner

BEACON-AWARE CO-EXISTENCE IN SHARED SPECTRUM

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for co-existence between wireless Radio Access Technologies (RATs) and related operations in shared spectrum are disclosed.

In one example, an apparatus for managing operation over a communication medium shared between RATs is disclosed. The apparatus may include, for example, a first transceiver, a second transceiver, and a processor and memory. The first transceiver may be configured in accordance with a first RAT and configured to monitor the medium for first RAT signaling. The processor and memory may be configured to determine a utilization metric associated with utilization of the medium by the first RAT signaling, determine a beacon schedule associated with the first RAT signaling, and set one or more parameters of a Time Division Multiplexed (TDM) communication pattern based on the utilization metric and the beacon schedule. The second transceiver may be configured in accordance with a second RAT and configured to cycle between activated periods and deactivated periods of communication over the medium in accordance with the TDM communication pattern.

In another example, a method of managing operation over a communication medium shared between RATs is disclosed. The method may include, for example, monitoring the medium, via a first transceiver configured in accordance with a first RAT, for first RAT signaling; determining a utilization metric associated with utilization of the medium by the first RAT signaling; determining a beacon schedule associated with the first RAT signaling; setting one or more parameters of a TDM communication pattern based on the utilization metric and the beacon schedule; and cycling, via a second transceiver configured in accordance with a second RAT, between activated periods and deactivated periods of communication over the medium in accordance with the TDM communication pattern.

In another example, another apparatus for managing operation over a communication medium shared between RATs is disclosed. The apparatus may include, for example, means for monitoring the medium, in accordance with a first RAT, for first RAT signaling; means for determining a utilization metric associated with utilization of the medium by the first RAT signaling; means for determining a beacon schedule associated with the first RAT signaling; means for setting one or more parameters of a TDM communication pattern based on the utilization metric and the beacon schedule; and means for cycling, in accordance with a second RAT, between activated periods and deactivated periods of communication over the medium in accordance with the TDM communication pattern.

In another example, a transitory or non-transitory computer-readable medium including code, which, when executed by a processor, causes the processor to perform operations for managing operation over a communication medium shared between RATs is disclosed. The computer-readable medium may include, for example, code for monitoring the medium, in accordance with a first RAT, for first RAT signaling; code for determining a utilization metric associated with utilization of the medium by the first RAT signaling; code for determining a beacon schedule associated with the first RAT signaling; code for setting one or more parameters of a TDM communication pattern based on the utilization metric and the beacon schedule; and code for cycling, in accordance with a second RAT, between activated periods and deactivated periods of communication over the medium in accordance with the TDM communication pattern.

In another example, another apparatus for managing operation over a communication medium shared between RATs is disclosed. The apparatus may include, for example, a first transceiver, a second transceiver, and a processor and memory. The first transceiver may be configured in accordance with a first RAT and configured to monitor the medium for first RAT signaling. The processor and memory may be configured to determine a beacon schedule associated with the first RAT signaling and schedule subframe puncturing on the medium in accordance with a second RAT based on the beacon schedule. The second transceiver may be configured in accordance with the second RAT and configured to puncture transmission over the medium in accordance with the scheduled subframe puncturing.

In another example, another method for managing operation over a communication medium shared between RATs is disclosed. The method may include, for example, monitoring the medium, via a first transceiver configured in accordance with a first RAT, for first RAT signaling; determining a beacon schedule associated with the first RAT signaling; scheduling subframe puncturing on the medium in accordance with a second RAT based on the beacon schedule; and puncturing, via a second transceiver configured in accordance with the second RAT, transmission over the medium in accordance with the scheduled subframe puncturing.

In another example, another apparatus for managing operation over a communication medium shared between RATs is disclosed. The apparatus may include, for example, means for monitoring the medium, in accordance with a first RAT, for first RAT signaling; means for determining a beacon schedule associated with the first RAT signaling; means for scheduling subframe puncturing on the medium in accordance with a second RAT based on the beacon schedule; and means for puncturing, in accordance with the second RAT, transmission over the medium in accordance with the scheduled subframe puncturing.

In another example, another transitory or non-transitory computer-readable medium including code, which, when executed by a processor, causes the processor to perform operations for managing operation over a communication medium shared between RATs is disclosed. The computer-readable medium may include, for example, code for monitoring the medium, in accordance with a first RAT, for first RAT signaling; code for determining a beacon schedule associated with the first RAT signaling; code for scheduling subframe puncturing on the medium in accordance with a second RAT based on the beacon schedule; and code for puncturing, in accordance with the second RAT, transmission over the medium in accordance with the scheduled subframe puncturing.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to beacon-aware co-existence schemes in shared spectrum. Various mechanisms are provided to avoid or at least reduce interference to beacon signals associated with other Radio Access Technologies (RATs) when operating in the shared spectrum. For example, one or more parameters defining the timing of a Time Division Multiplexed (TDM) communication pattern such as Carrier Sense Adaptive Transmission (CSAT) implemented for co-existence purposes may be set to minimize the overlap of activated periods of communication with the beacon signals. As another example, multiple component carriers may be used to schedule around beacon signaling. As another example, subframe puncturing may be scheduled to align with the beacon signaling.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
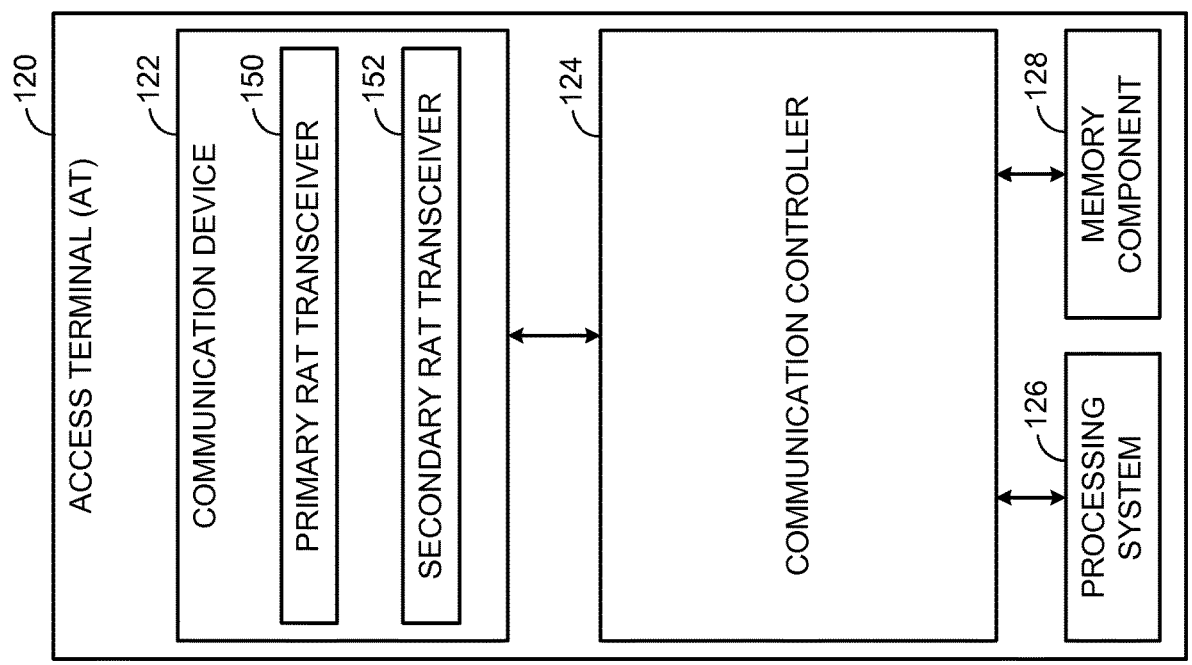
FIG. 1 illustrates an example wireless communication system including an Access Point (AP) in communication with an Access Terminal (AT).
Figure 1:
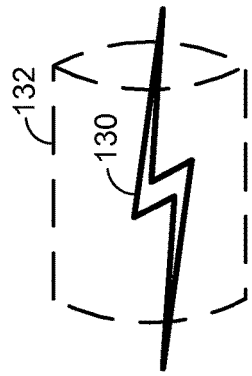
Figure 1:
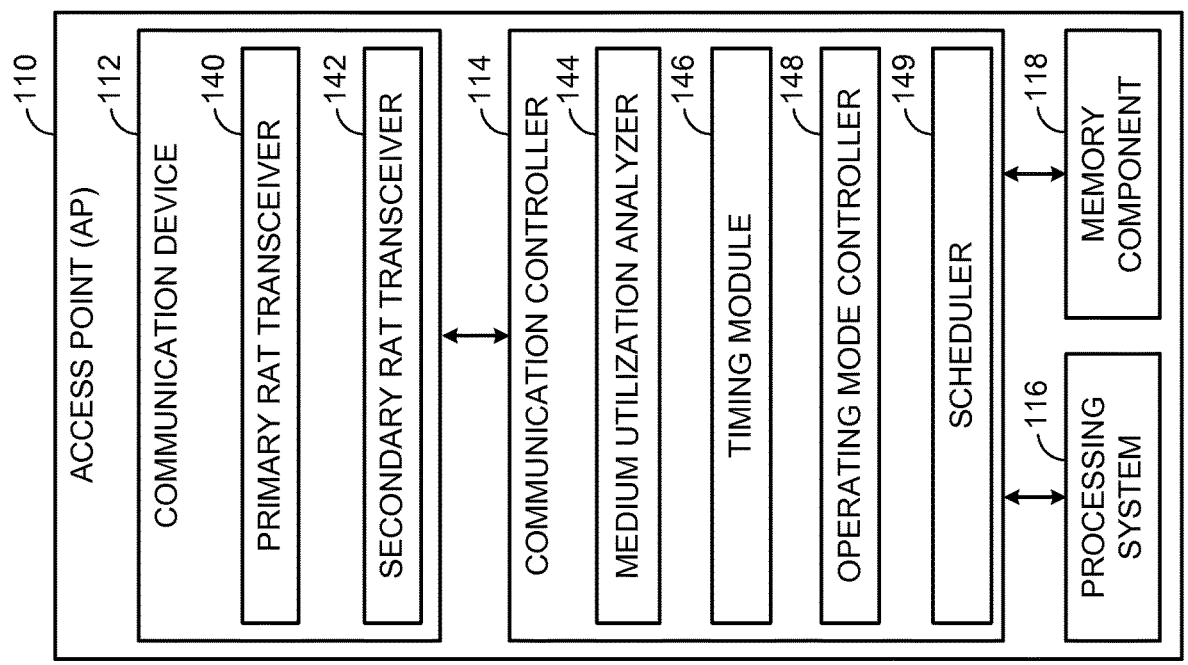

FIG. 1 illustrates an example wireless communication system including an Access Point (AP) in communication with an Access Terminal (AT). Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wi-Fi APs, other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128, where the memory components 118 and 128 can be on-board cache memory, separate components, a combination, etc.). In some designs, the communication controllers 114 and 124 may be partly or wholly subsumed by the respective host system functionality.

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate over a communication medium of interest, shown by way of example in FIG. 1 as the medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the medium 132.

As an example, the medium 132 may correspond to at least a portion of an unlicensed frequency band shared with other RATs. In general, the access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the access point 110 includes two co-located transceivers operating according to respective RATs, including a primary RAT transceiver 140 configured to operate in accordance with one RAT to predominantly communicate with the access terminal 120 and a secondary RAT transceiver 142 configured to operate in accordance with another RAT to predominantly interact with other-RAT devices that may be sharing the communication medium 132. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a Wi-Fi chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The primary RAT transceiver 140 and the secondary RAT transceiver 142 may provide different functionalities and may be used for different purposes. As an example, the primary RAT transceiver 140 may operate in accordance with Long Term Evolution (LTE) technology to provide communication with the access terminal 120 on the wireless link 130, while the secondary RAT transceiver 142 may operate in accordance with Wi-Fi technology to monitor Wi-Fi signaling on the medium 132 that may interfere with or be interfered with by the LTE communications. The secondary RAT transceiver 142 may or may not serve as a full Wi-Fi AP providing communication services to a corresponding Basic Service Set (BSS). The communication device 122 of the access terminal 120 may, in some designs, include similar primary RAT transceiver and/or secondary RAT transceiver functionality, as shown in FIG. 1 by way of the primary RAT transceiver 150 and the secondary RAT transceiver 152, although such dual-transceiver functionality may not be required.

As will be discussed in more detail below with reference to FIGS. 2-8, the communication controller 114 of the access point 110 may include a medium utilization analyzer 144, a timing module 146, an operating mode controller 148, and a scheduler 149, which may operate in conjunction with the primary RAT transceiver 140 and/or the secondary RAT transceiver 142 to manage operation on the medium 132. In addition or as an alternative, in some designs, the communication controller 124 of the access terminal 120 may include similar or complimentary components (not shown), although this is not required.

Figure 2:
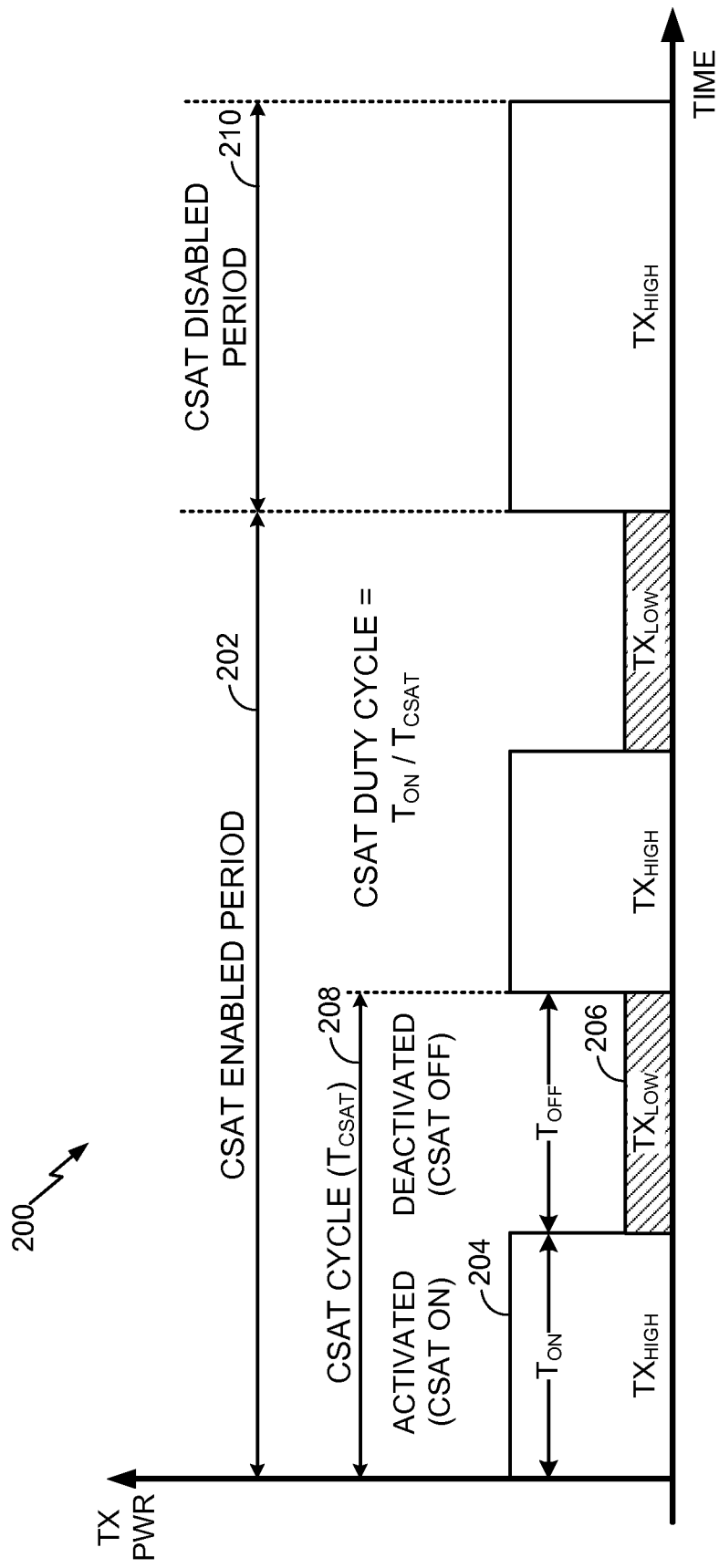
FIG. 2 illustrates certain aspects of an example Time Division Multiplexed (TDM) communication scheme referred to herein as Carrier Sense Adaptive Transmission (CSAT).

FIG. 2 illustrates certain aspects of an example Time Division Multiplexed (TDM) communication scheme referred to herein as Carrier Sense Adaptive Transmission (CSAT) that may be implemented on the medium 132. A CSAT communication scheme may be used to foster co-existence between (i) primary RAT communications between the access point 110 and access terminal 120 and (ii) other, secondary RAT communications between neighboring devices, for example, by cycling operation of the primary RAT over the medium 132 (e.g., on a corresponding Secondary Cell (SCell) provided by the access point 110 on the unlicensed band) in accordance with a TDM communication pattern 200. A CSAT communication scheme as provided herein may offer several advantages for mixed-RAT co-existence environments.

As shown, during a CSAT enabled period 202, operation of the primary RAT may be cycled over time between activated (CSAT ON) periods 204 and deactivated (CSAT OFF) periods 206. A given activated period 204/deactivated period 206 pair may constitute a CSAT cycle ($T_{CSAT}$) 208. During a period of time $T_{ON}$ associated with each activated period 204, primary RAT transmission on the medium 132 may proceed at a normal, relatively high transmission power. During a period of time $T_{OFF}$ associated with each deactivated period 206, however, primary RAT transmission on the medium 132 is reduced or even fully disabled to yield the medium 132 to neighboring devices operating according to the secondary RAT. By contrast, during a CSAT disabled period 210, the cycling may be disabled.

Each of the associated CSAT parameters, including, for example, a duty cycle (i.e., $T_{ON}/T_{CSAT}$) and the respective transmission powers during activated periods 204 and deactivated periods 206, may be adapted based on the current signaling conditions on the medium 132 to dynamically optimize the CSAT communication scheme. For example, the secondary RAT transceiver 142 configured to operate in accordance with the secondary RAT (e.g., Wi-Fi) may be further configured to monitor the medium 132 for secondary RAT signaling, which may interfere with or be interfered with by primary RAT communications over the medium 132. The medium utilization analyzer 144 may be configured to determine a utilization metric associated with utilization of the medium 132 by the secondary RAT signaling. Based on the utilization metric, the associated parameters may be set and the primary RAT transceiver 140 configured to operate in accordance with the primary RAT (e.g., LTE) may be further configured to cycle between activated periods 204 of communication and deactivated periods 206 of communication over the medium 132 in accordance therewith. As an example, if the utilization metric is high (e.g., above a threshold), one or more of the parameters may be adjusted such that usage of the medium 132 by the primary RAT transceiver 140 is reduced (e.g., via a decrease in the duty cycle or transmission power). Conversely, if the utilization metric is low (e.g., below a threshold), one or more of the parameters may be adjusted such that usage of the medium 132 by the primary RAT transceiver 140 is increased (e.g., via an increase in the duty cycle or transmission power).

In some designs, one or more of the parameters may also be adjusted to mitigate the impact of primary RAT transmission on, in particular, beacon signaling or the like exchanged between neighboring devices operating according to the secondary RAT. Typically, beacon signals carry important information that may disproportionately impact system operation when interrupted. In Wi-Fi, for example, each Wi-Fi AP, which may correspond to a Basic Service Set (BSS), periodically broadcasts beacon frames with system information that enables any Wi-Fi STAs within wireless range of the AP to establish and/or maintain a communication link with the Wi-Fi network. Interference with beacon frames may therefore result in a substantial disruption of service.

Figure 3:
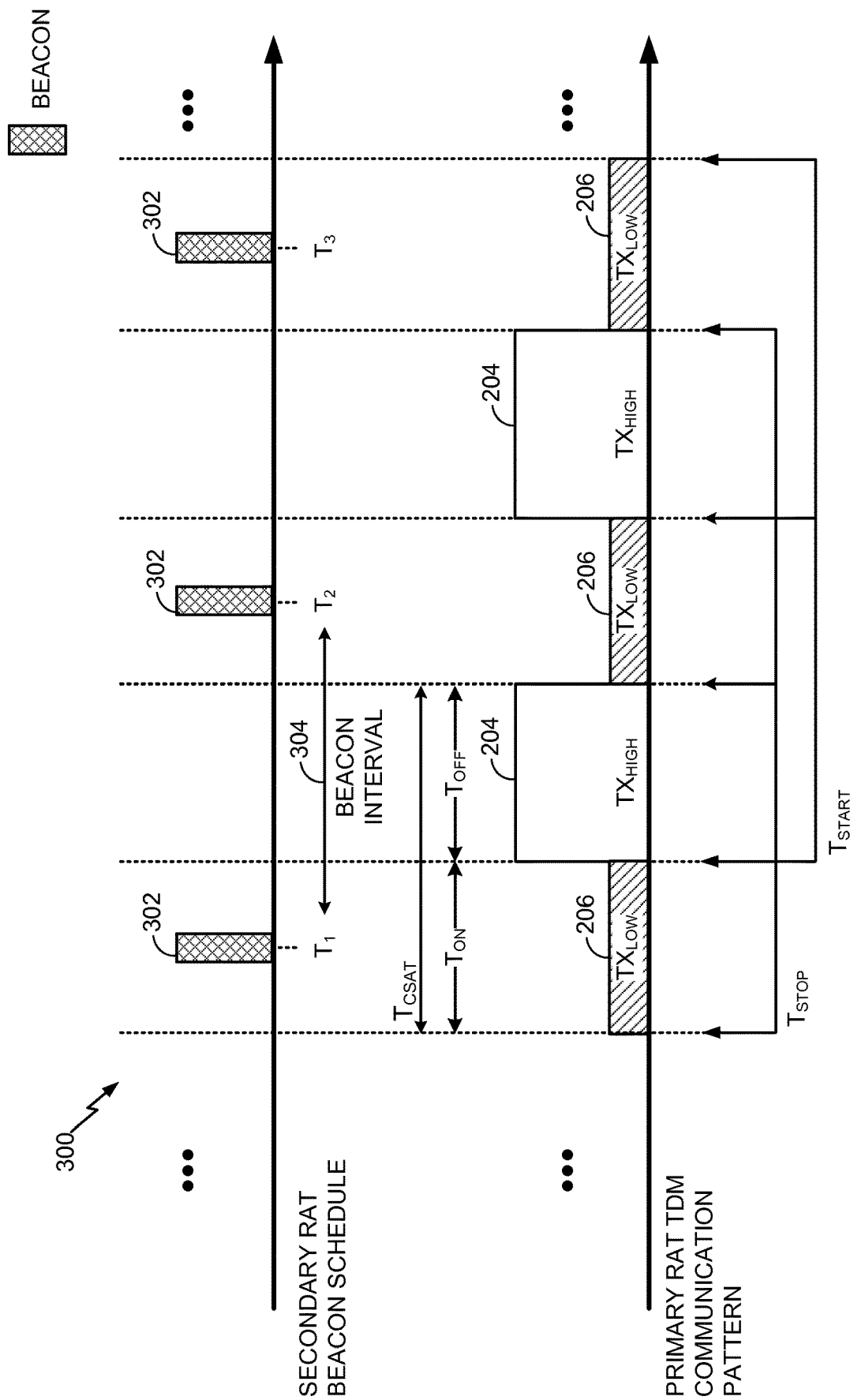
FIG. 3 is a timing diagram illustrating an example beacon-aware TDM communication scheme.

FIG. 3 is a timing diagram illustrating an example beacon-aware TDM communication scheme. In this example, the TDM communication pattern is formed as a series of the activated periods 204 and deactivated periods 206 described in more detail above with reference to FIG. 2.

As shown, the timing module 146 may initially determine a beacon schedule 300 for one or more neighboring devices operating on the medium 132 in accordance with the secondary RAT. The beacon schedule 300 may include, by way of example, a series of beacons 302, which may be spaced apart by a given beacon interval 304 and scheduled for transmission at a given target beacon transmission time ($T_1$, $T_2$, $T_3$, and so on). In some designs, the beacon schedule 300 may be determined by reading one or more corresponding information fields present in one of the beacons 302. In Wi-Fi, for example, each beacon frame includes a beacon interval field that dictates a Target Beacon Transmission Time (TBTT). In other designs, inferential techniques may be used to determine the beacon schedule 300.

The beacon schedule 300 may accordingly be determined from the secondary RAT signaling monitored by the secondary RAT transceiver 142, either directly at the access point 110 or indirectly via the access terminal 120 (e.g., via measurement reports for secondary RAT signaling received from the access terminal 120). In Wi-Fi, for example, the IEEE 802.11k revision of the IEEE 802.11 family of protocols provides mechanisms for reporting various information from an STA to an AP. The use of such measurement reports may allow the timing module 146 to identify a beacon schedule for even hidden nodes that may not be otherwise visible to the access point 110 directly.

Based on the beacon schedule 300, the operating mode controller 148 may set one or more parameters of a TDM communication pattern such as the CSAT communication pattern 200 so as to avoid or at least reduce interference with beacon signaling. For example, the parameters may be set to align the activated periods 204 with time intervals between successive beacons 302 in the beacon schedule 300, as shown in FIG. 3. To the extent possible or practicable, the parameters may be set to minimize an overlap between the activated periods 204 and the beacons 302.

To this end, the operating mode controller 148 may set, for example, a start time parameter ($T_{START}$) defining the transition boundary from a deactivated period 206 to an activated period 204, a stop time parameter ($T_{STOP}$) defining the transition boundary from an activated period 204 to a deactivated period 206, a duration parameter ($T_{ON}/T_{OFF}$) defining the duration of an activated period 204 and/or a deactivated period 206, a duty cycle parameter (TCSAT) defining the percentage of time allocated to an activated period 204 or a deactivated period 206 within a given cycle, or any other parameter generally defining the timing of activated periods 204.

In some instances, such as when it may not be possible or practical to avoid interference with all beacon signaling, certain types of beacons may be prioritized over other types of beacons for the purposes of interference avoidance. In Wi-Fi, for example, some beacons may convey a special kind of Traffic Indication Map (TIM) known as a Delivery Traffic Indication Map (DTIM), which informs the STA about the presence of buffered multicast/broadcast data at the AP. The DTIM is generated within a given beacon at a frequency specified by a DTIM interval. Accordingly, beacons conveying a DTIM may warrant preferential protection.

Figure 4:
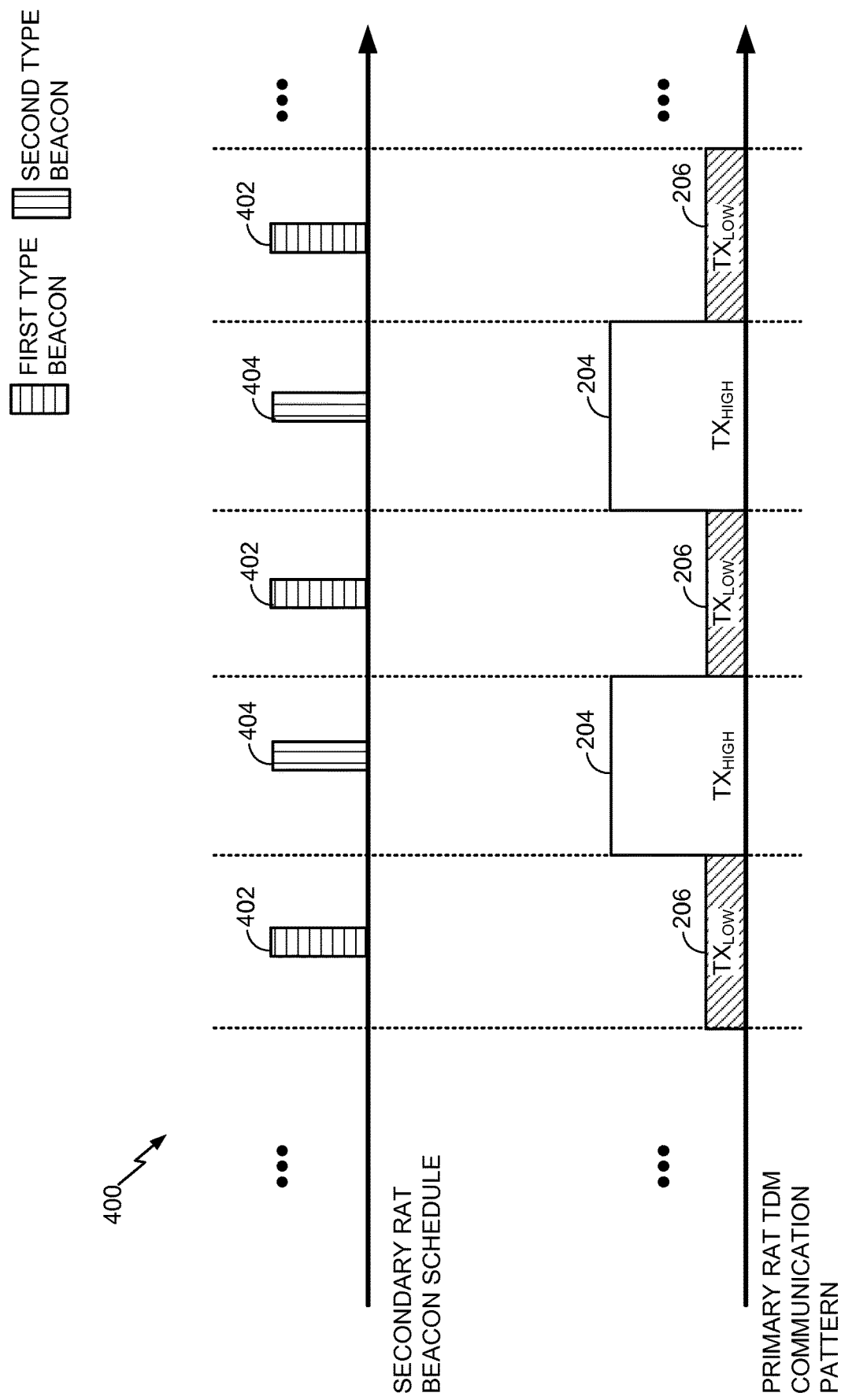
FIG. 4 is a timing diagram illustrating another example beacon-aware TDM communication scheme.

FIG. 4 is a timing diagram illustrating another example beacon-aware TDM communication scheme. In this example, as in the example of FIG. 3, the TDM communication pattern is again formed as a series of the activated periods 204 and deactivated periods 206 described in more detail above with reference to FIG. 2. The beacon schedule 400, however, in contrast to the beacon schedule 300 of FIG. 3, includes a first type of beacon 402 and a second type of beacon 404.

Here, the timing module 146 may determine not only the beacon schedule 400 for one or more neighboring devices operating on the medium 132 in accordance with the secondary RAT, but also identify each beacon in the beacon schedule 400 as corresponding to the first type of beacon 402 or the second type of beacon 404. The operating mode controller 148 may then set the one or more parameters to prioritize avoiding alignment of the activated periods 204 with the first type of beacon 402 over the second type of beacon 404, as shown (or vice versa).

Returning to FIG. 1, in addition or as an alternative to the TDM-based techniques above, the scheduler 149 may take advantage of multiple component carriers available for primary RAT operation (e.g., defining respective SCells) to schedule data traffic around beacon signaling.

Figure 5:
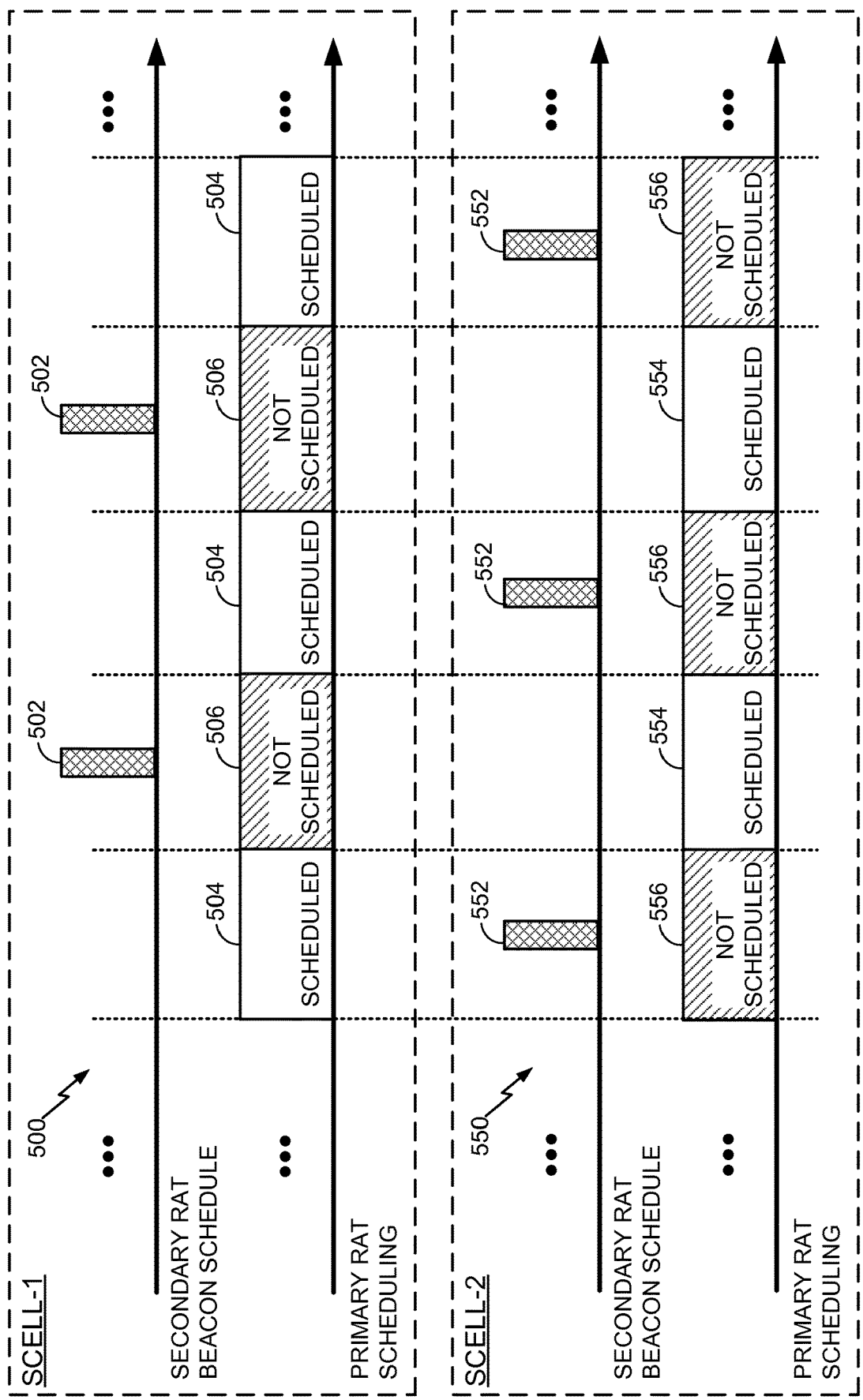
FIG. 5 is a timing diagram illustrating an example of beacon-aware scheduler hopping across component carriers.

FIG. 5 is a timing diagram illustrating an example of beacon-aware scheduler hopping across component carriers. In this example, the access point 110 provides two SCells (SCell-1 and SCell-2) on respective component carriers. On the component carrier of the first SCell (SCell-1), the timing module 146 may determine that a first beacon schedule 500 defining a first series of beacons 502 is in use by one or more neighboring devices operating on the medium 132 in accordance with the secondary RAT. On the component carrier of the second SCell (SCell-2), the timing module 146 may determine that a second beacon schedule 550 defining a second series of beacons 552 is in use by one or more neighboring devices operating on the medium 132 in accordance with the secondary RAT.

As shown, the first beacon schedule 500 and the second beacon schedule 550 may be staggered in time. The scheduler 149 may accordingly schedule primary RAT transmissions on the first SCell (SCell-1) in time slots 504 between the beacons 502 of the first beacon schedule 500 while refraining from scheduling (which may be referred to as component carrier muting) primary RAT transmissions on the first SCell (SCell-1) in time slots 506 that overlap with the beacons 502 of the first beacon schedule 500. Similarly, the scheduler 149 may schedule primary RAT transmissions on the second SCell (SCell-2) in time slots 554 between the beacons 552 of the second beacon schedule 550 while refraining from scheduling primary RAT transmissions on the second SCell (SCell-2) in time slots 556 that overlap with the beacons 552 of the second beacon schedule 550. In this way, transmission may be scheduled or "hopped" in frequency space around beacon signaling that is to be protected. In some circumstances, such as where it may not be possible to schedule around certain beacon signaling, the scheduler 149 may block transmission to yield the medium 132 to the beacon signaling.

Returning again to FIG. 1, as another addition or as another alternative to the TDM-based techniques above, the scheduler 149 may also be configured to schedule subframe puncturing on the medium 132 in accordance with the primary RAT based on the beacon scheduling. As used herein, "puncturing" refers to the transmission of some signals ordinarily associated with a given frame, subframe, or the like, and the omission of other signals ordinarily associated with that frame, subframe, or the like. Subframe puncturing may be used to mitigate the impact of primary RAT transmission on beacon signaling.

Figure 6:
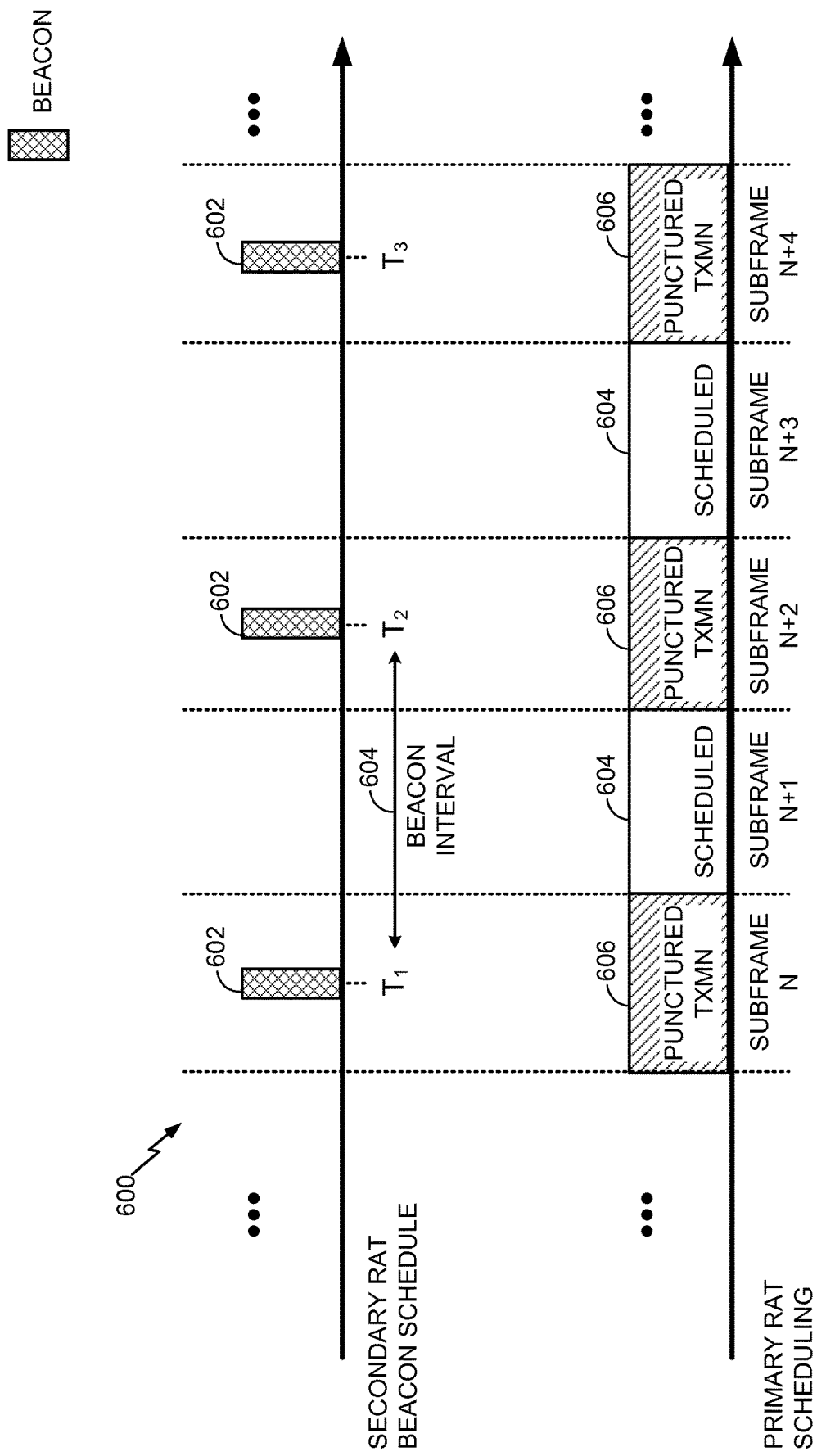
FIG. 6 is a timing diagram illustrating an example of beacon-aware subframe puncturing.

FIG. 6 is a timing diagram illustrating an example of beacon-aware subframe puncturing. In this example as in the example of FIG. 3, the timing module 146 may initially determine a beacon schedule 600 for one or more neighboring devices operating on the medium 132 in accordance with the secondary RAT. The beacon schedule 600 may include, by way of example, a series of beacons 602, which may be spaced apart by a given beacon interval 604 and scheduled for transmission at a given target beacon transmission time ($T_1$, $T_2$, $T_3$, and so on). As discussed in more detail above, the beacon schedule 600 may be determined by reading one or more corresponding information fields present in one of the beacons 602 or by other inferential techniques, from the secondary RAT signaling monitored by the secondary RAT transceiver 142, either directly at the access point 110 or indirectly via the access terminal 120.

Based on the beacon schedule 600, the scheduler 149 may schedule subframe puncturing on the medium 132 so as to avoid or at least reduce interference with beacon signaling. For example, the scheduler 149 may schedule subframe puncturing to align with the beacons 602 in the beacon schedule 600. In the illustrated example, subframes N, N+2, and N+4, which overlap with one of the beacons 602 in the beacon schedule 600, are scheduled to be punctured. Meanwhile, subframes N+1 and N+3, which do not overlap with any of the beacons 602 in the beacon schedule 600, are scheduled for normal transmission without puncturing. It will be appreciated that the length and distribution of the beacons 602 with respect to the subframes N through N+4 is shown for illustration purposes only and may not be to scale.

Subframes N, N+2, and N+4 may be punctured in different ways. As an example, the scheduler 149 may employ a data channel (e.g., Physical Downlink Shared Channel (PDSCH)) muting mechanism. As another example, the scheduler 149 may employ a broadcast channel (e.g., Multicast-Broadcast Single-Frequency Network (MBSFN), Almost Blank Subframe (ABS), etc.) blanking mechanism. The puncturing and punctured subframes of the type described herein may include not simply completely blank subframes, but rather, subframes in which certain control signaling is still transmitted on some symbols of the subframe for use in maintaining system coordination and the like.

Figure 7:
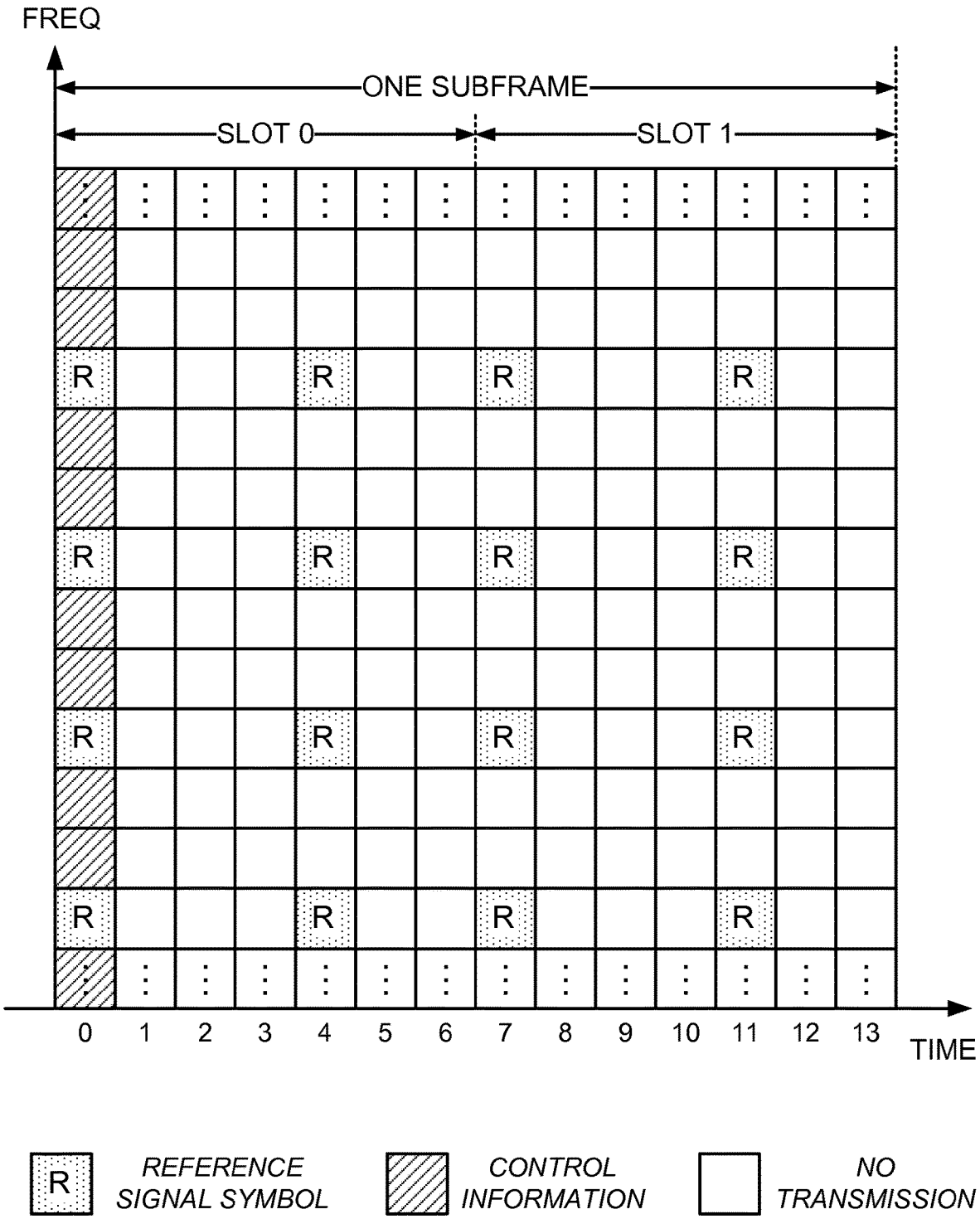
FIG. 7 is a resource map diagram illustrating an example data channel muting subframe format for use in subframe puncturing.

FIG. 7 is a resource map diagram illustrating an example data channel muting subframe format for use in subframe puncturing. In this example, the data channel is provided via PDSCH.

Ordinarily, PDSCH subframes include (i) a Cell-specific Reference Signal (CRS) signal in the first and fifth symbol periods of each slot of the subframe and control signaling in the first M periods of the subframe, where $M \geq 1$ depending on the number of antenna ports, and (ii) data in the remaining symbol periods of the subframe. A muted PDSCH subframe of the type illustrated in FIG. 7 includes (i) the CRS signal and the control information in the first M symbol periods of the subframe but (ii) no data transmissions in the remaining symbol periods of the subframe. The PDSCH muting configuration may be user-specific and signaled via a higher-layer. The intra-subframe location of muted resource elements can be indicated by a corresponding bitmap, for example, where all resource elements set to 1 are muted (zero power assumed at the user device).

In more detail and with reference to FIG. 7, a CRS signal may be sent in symbol period 0 (e.g., on different sets of subcarriers from different antennas). The PCFICH may also be sent in symbol period 0 of the subframe, and the PDCCH and PHICH may be sent in symbol periods 0 to M−1, where M=1 for the design shown in FIG. 7 but in general M≤3. No data transmissions are sent in the remaining symbol periods M to 13.

By configuring one or more subframes for data channel muting in accordance with the beacon schedule 600, the scheduler 149 may then refrain from scheduling data during one or more corresponding symbol periods to free the medium 132 for secondary RAT operations of one or more neighboring devices. As shown in FIG. 17, a muted subframe may not be completely blank because CRS or other control signaling may still be sent on some symbols of the subframe. The other symbols, however, will provide sufficient opportunities for the beacons 602 to propagate over the medium 132.

Figure 8:
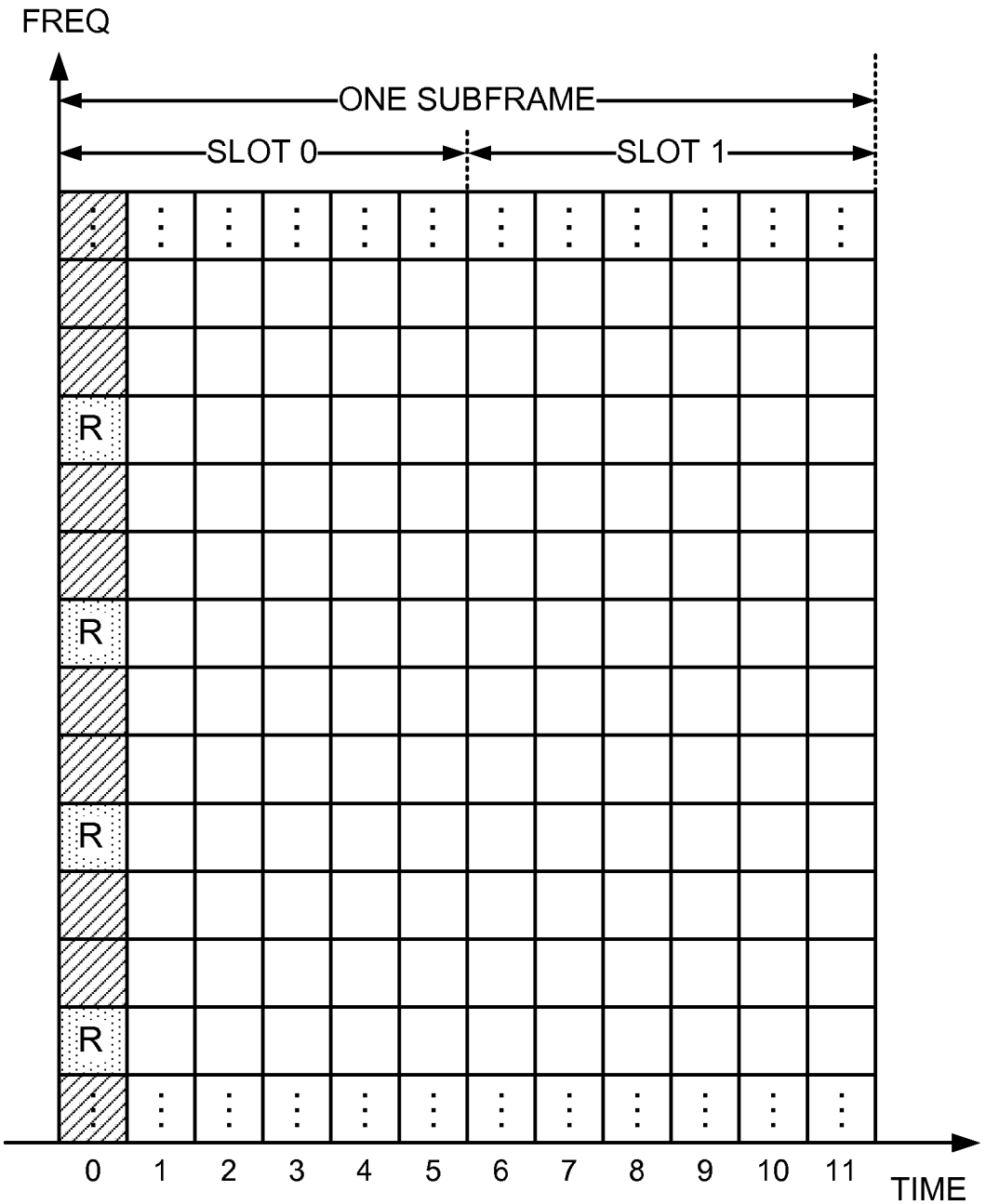
FIG. 8 is a resource map diagram illustrating an example broadcast channel blanking subframe format for use in subframe puncturing.

FIG. 8 is a resource map diagram illustrating an example broadcast channel blanking subframe format for use in subframe puncturing. In this example, the broadcast channel is provided via MBSFN.

Ordinarily, MBSFN subframes include (i) a CRS signal and control information in the first M symbol periods of the subframe, where M≥1 depending on the number of antenna ports, and (ii) broadcast data in the remaining symbol periods of the subframe. A blanked MBSFN subframe of the type illustrated in FIG. 8 includes (i) the CRS signal and the control information in the first M symbol periods of the subframe but (ii) no transmissions in the remaining symbol periods of the subframe.

In more detail and with reference to FIG. 8, a CRS signal may be sent in symbol period 0 (e.g., on different sets of subcarriers from different antennas). The Physical Control Format Indicator Channel (PCFICH) may also be sent in symbol period 0 of the subframe, and the Physical Downlink Control Channel (PDCCH) and Physical Hybrid-ARQ Indicator Channel (PHICH) may be sent in symbol periods 0 to M−1, where M=1 for the design shown in FIG. 8 but in general M≤2 for MBSFN subframes. No data or control transmissions are sent in the remaining symbol periods M to 11.

By configuring one or more subframes for broadcast channel operation in accordance with the beacon schedule 600, the scheduler 149 may reserve one or more corresponding symbol periods for a multi-cell transmission and then refrain from scheduling transmission during the one or more corresponding symbol periods to free the medium 132 for secondary RAT operations of one or more neighboring devices. As shown in FIG. 8, a blanked subframe may not be completely blank because CRS or other control signaling may still be sent on some symbols of the subframe. The other symbols, however, will provide sufficient opportunities for the beacons 602 to propagate over the medium 132.

It will appreciated that other blanking mechanisms may be employed as well, including, for example, Almost Blank Subframe (ABS) muting, in which the scheduler 149 may transmit certain control signals while omitting other signals that would otherwise be transmitted during corresponding symbol periods of a given subframe.

Figure 9:
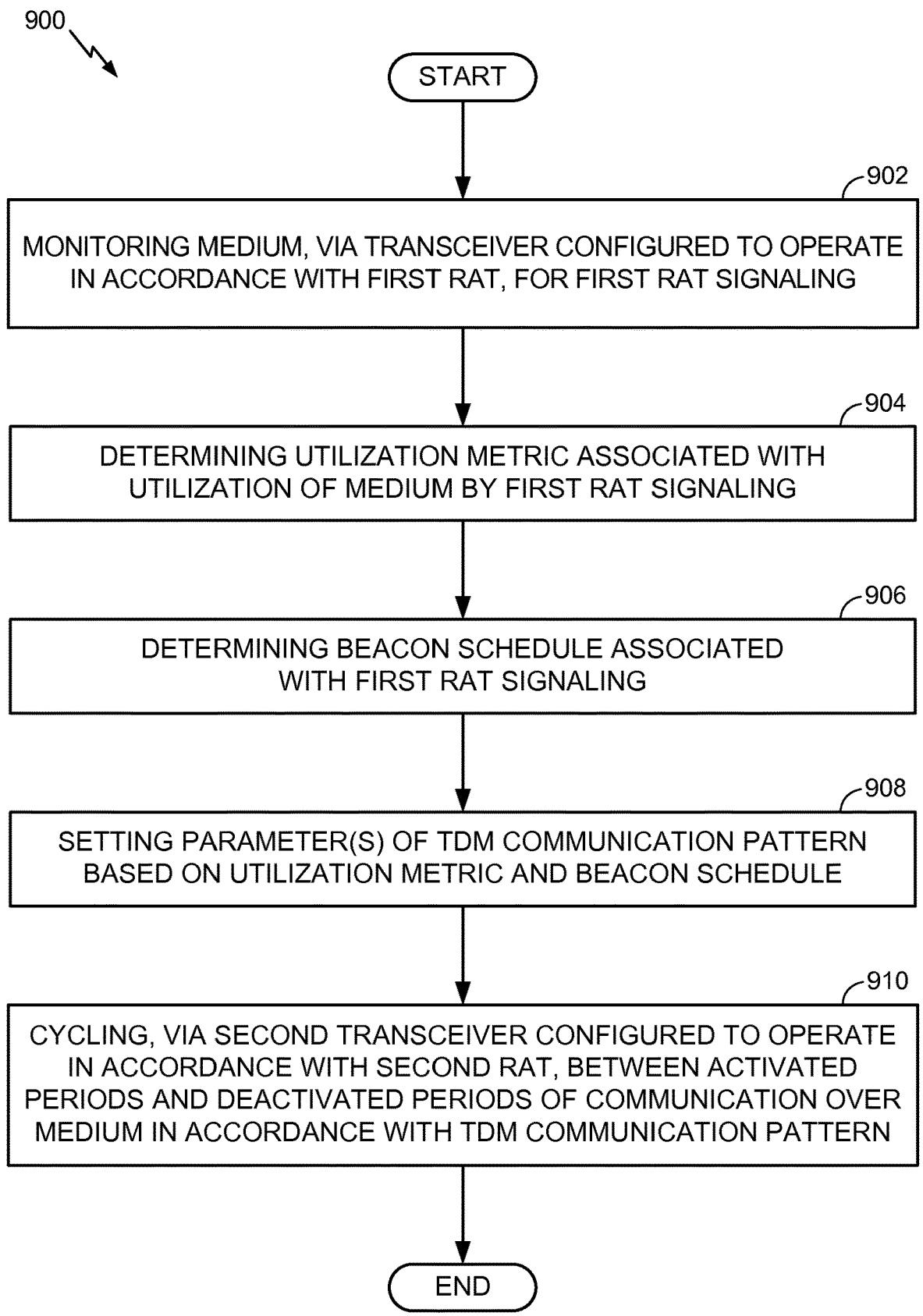
FIG. 9 is a flow diagram illustrating an example method of managing operation over a communication medium shared between RATs.

FIG. 9 is a flow diagram illustrating an example method of managing operation over a communication medium shared between RATs in accordance with the techniques described above. As a particular example, the medium may include one or more time, frequency, or space resources on an unlicensed radio frequency band shared between LTE technology and Wi-Fi technology devices. The method 900 may be performed, for example, by an access point (e.g., the access point 110 illustrated in FIG. 1).

As shown, the access point may monitor (block 902) the medium, via a first transceiver configured in accordance with a first RAT, for first RAT signaling. The monitoring may be performed, for example, by a transceiver such as the secondary RAT transceiver 142 or the like. The access point may then determine (block 904) a utilization metric associated with utilization of the medium by the first RAT signaling. The determining may be performed, for example, by a processor and memory such as the processor 116 and memory 118 or the like. The access point may also determine (block 906) a beacon schedule associated with the first RAT signaling. The determining may be performed, for example, by a processor and memory such as the processor 116 and memory 118 or the like. Based on the utilization metric and the beacon schedule, the access point may set (block 908) one or more parameters of a TDM communication pattern. The setting may be performed, for example, by controller processor and memory such as the processor 116 and memory 118 or the like. The access point may then cycle (block 910), via a second transceiver configured in accordance with a second RAT, between activated periods and deactivated periods of communication over the medium in accordance with the TDM communication pattern. The cycling may be performed, for example, by a transceiver such as the primary RAT transceiver 140 or the like.

As discussed in more detail above, the one or more parameters may include, for example, a start time parameter defining the activated periods of the TDM communication pattern, a stop time parameter defining the activated periods of the TDM communication pattern, a duration parameter defining the activated periods of the TDM communication pattern, a duty cycle parameter defining the activated periods of the TDM communication pattern, or a combination thereof. The setting (block 908) may include setting the one or more parameters to align the activated periods with time intervals between successive beacon signals in the beacon schedule. In particular, the one or more parameters may be set based on an overlap between the activated periods and the beacon signals.

The determining (block 906) of the beacon schedule may include, for example, determining a beacon interval, a target beacon transmission time, or a combination thereof for the beacon schedule by reading one or more corresponding information fields present in beacon signals of the first RAT signaling.

In some designs, a first type of beacon and a second type of beacon associated with the beacon schedule may be identified, with the setting (block 908) including setting the one or more parameters to stagger the activated periods with beacon signals of the first type (e.g., while aligning the activated periods with beacon signals of the second type). As an example, the first type of beacon may correspond to a beacon conveying a DTIM.

In some designs, beacon signal information may be received from an access terminal (such as the access terminal 120), with the beacon schedule being determined based on the received beacon signal information.

As also discussed in more detail above, in addition or as an alternative, transmission may be scheduled (i) on a first frequency to align data traffic with time intervals between successive beacon signals in a first beacon schedule and (ii) on a second frequency to align the data traffic with time intervals between successive beacon signals in a second beacon schedule, with the first and second beacon schedules being staggered in time.

Figure 10:
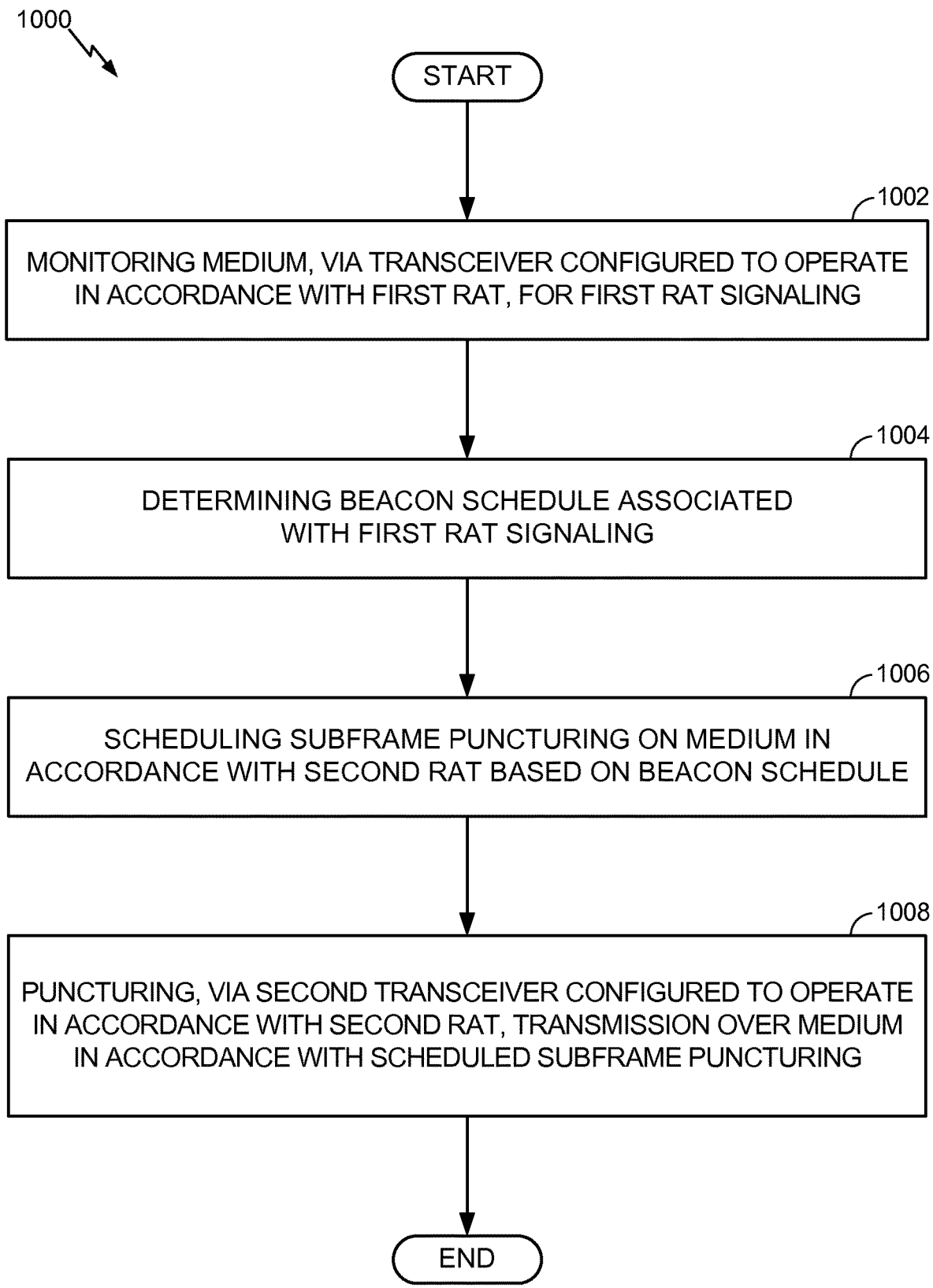
FIG. 10 is another flow diagram illustrating another example method of managing operation over a communication medium shared between RATs.

FIG. 10 is a flow diagram illustrating an example method of managing operation over a communication medium shared between RATs in accordance with the techniques described above. As a particular example, the medium may include one or more time, frequency, or space resources on an unlicensed radio frequency band shared between LTE technology and Wi-Fi technology devices. The method 1000 may be performed, for example, by an access point (e.g., the access point 110 illustrated in FIG. 1).

As shown, the access point may monitor (block 1002) the medium, via a first transceiver configured in accordance with a first RAT, for first RAT signaling. The monitoring may be performed, for example, by a transceiver such as the secondary RAT transceiver 142 or the like. The access point may then determine (block 1004) a beacon schedule associated with the first RAT signaling. The determining may be performed, for example, by a processor and memory such as the processor 116 and memory 118 or the like. Based on the beacon schedule, the access point may schedule (block 1006) subframe puncturing on the medium in accordance with a second RAT. The scheduling may be performed, for example, by a processor and memory such as the processor 116 and memory 118 or the like. The access point may then puncture (block 1008), via a second transceiver configured to operate in accordance with the second RAT, transmission over the medium in accordance with the scheduled subframe puncturing. The puncturing may be performed, for example, by a transceiver such as the primary RAT transceiver 140 or the like.

As an example, the subframe puncturing may be scheduled to align with beacon signals in the beacon schedule.

As discussed in more detail above, the scheduling (block 1006) may include, for example, scheduling the subframe puncturing for one or more subframes by (i) configuring the one or more subframes for data channel muting with respect to one or more corresponding symbol periods; and (ii) refraining from scheduling data during the one or more corresponding symbol periods. As another example, the scheduling (block 1006) may include scheduling the subframe puncturing for one or more subframes by (i) configuring the one or more subframes for broadcast channel operation to reserve one or more corresponding symbol periods for a multi-cell transmission; and (ii) refraining from transmitting during the one or more corresponding symbol periods. As another example, the scheduling (block 1006) may include scheduling the subframe puncturing for one or more subframes by (i) configuring the one or more subframes for ABS muting with respect to one or more corresponding symbol periods; and (ii) transmitting one or more control signals while omitting one or more other signals during the one or more corresponding symbol periods For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 11:
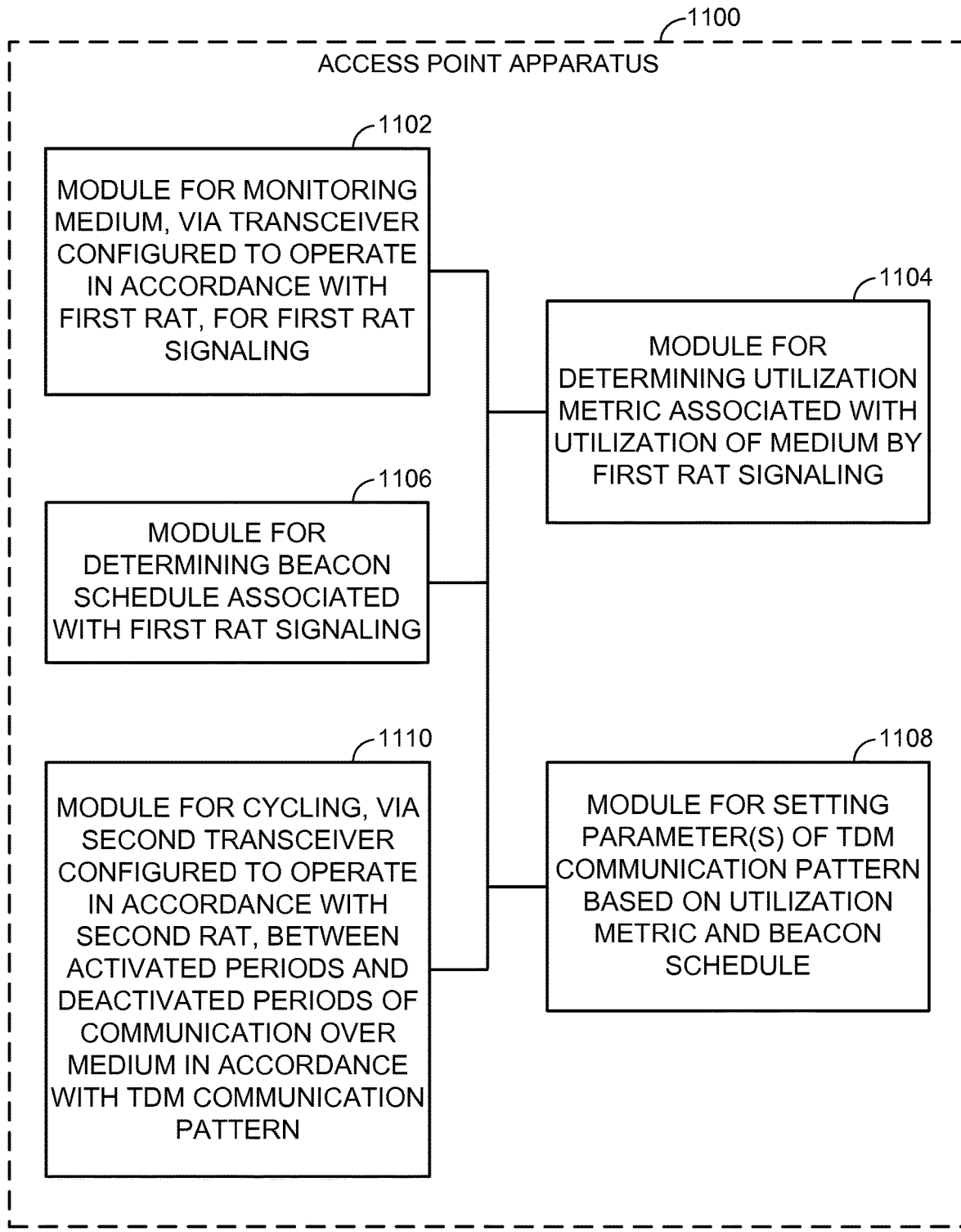
FIG. 11 illustrates an example access point apparatus represented as a series of interrelated functional modules.
Figure 12:
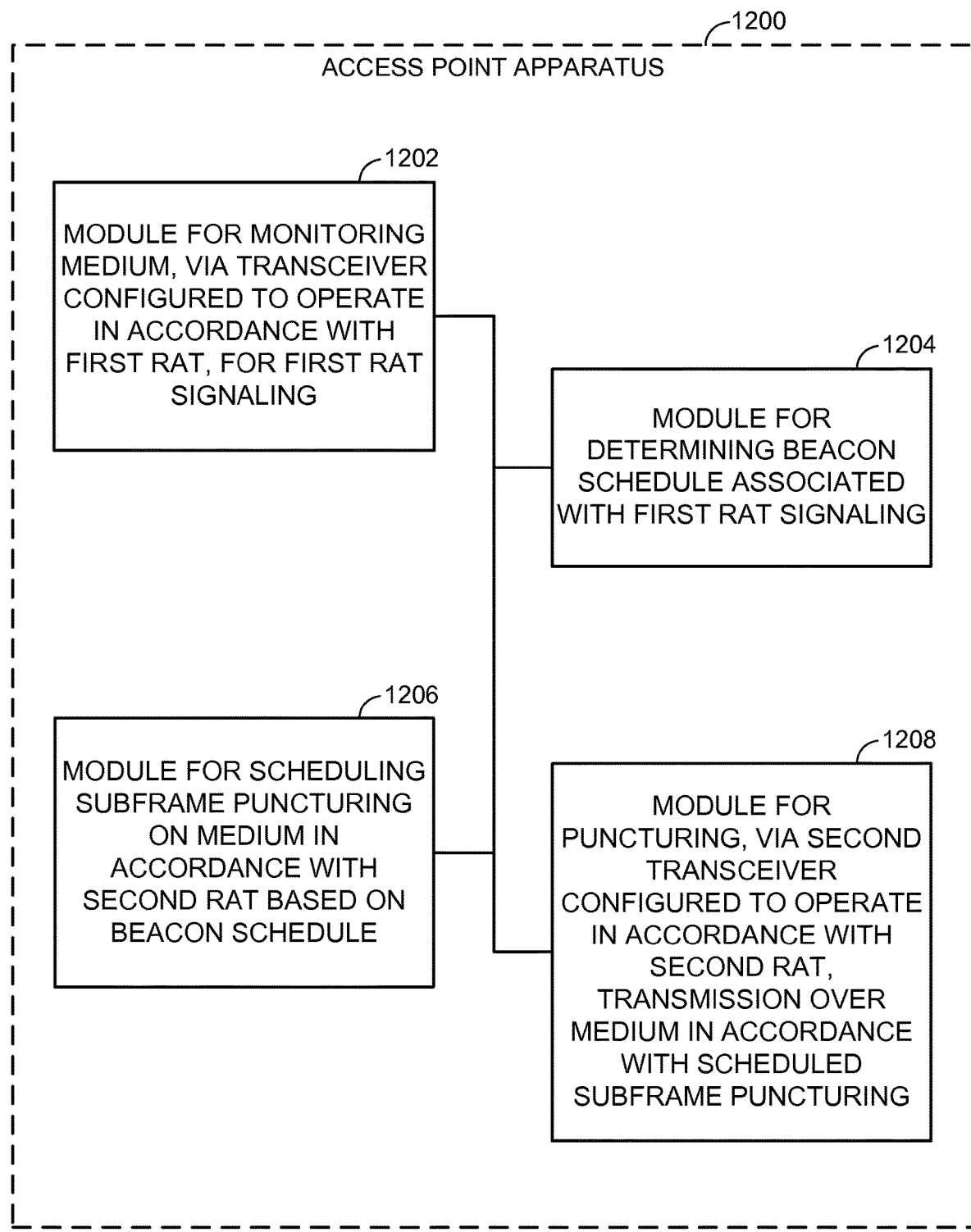
FIG. 12 illustrates another example point terminal apparatus represented as a series of interrelated functional modules.

FIGS. 11-12 provide alternative illustrations of apparatuses for implementing the access point 110 and/or the access terminal 120 represented as a series of interrelated functional modules.

FIG. 11 illustrates an example access point apparatus 1100 represented as a series of interrelated functional modules. A module for monitoring 1102 may correspond at least in some aspects to, for example, a communication device or a component thereof as discussed herein (e.g., the communication device 112 or the like). A module for determining 1104 may correspond at least in some aspects to, for example, a communication controller or a component thereof as discussed herein (e.g., the communication controller 114 or the like). A module for determining 1106 may correspond at least in some aspects to, for example, a communication controller or a component thereof as discussed herein (e.g., the communication controller 114 or the like). A module for setting 1108 may correspond at least in some aspects to, for example, a communication controller or a component thereof as discussed herein (e.g., the communication controller 114 or the like). A module for cycling 1110 may correspond at least in some aspects to, for example, a communication device or a component thereof as discussed herein (e.g., the communication device 112 or the like).

FIG. 12 illustrates an example access point apparatus 1200 represented as a series of interrelated functional modules. A module for monitoring 1202 may correspond at least in some aspects to, for example, a communication device or a component thereof as discussed herein (e.g., the communication device 112 or the like). A module for determining 1204 may correspond at least in some aspects to, for example, a communication controller or a component thereof as discussed herein (e.g., the communication controller 114 or the like). A module for scheduling 1206 may correspond at least in some aspects to, for example, a communication controller or a component thereof as discussed herein (e.g., the communication controller 114 or the like). A module for puncturing 1208 may correspond at least in some aspects to, for example, a communication device or a component thereof as discussed herein (e.g., the communication device 112 or the like).

The functionality of the modules of FIGS. 11-12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 11-12, as well as other components and functions described herein, may be implemented using any suitable means. Such means also may be implemented, at least in part, using corresponding structure as taught herein. For example, the components described above in conjunction with the "module for" components of FIGS. 11-12 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An example storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for managing operation over a communication medium shared between RATs.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An access point for managing operation over a communication medium shared between Radio Access Technologies (RATs), comprising:
    a first transceiver configured in accordance with a first RAT and configured to monitor the medium for first RAT signaling being exchanged between neighboring devices of the access point;
    a processor and memory configured to:
        determine a utilization metric associated with utilization of the medium by the first RAT signaling,
        determine a beacon schedule associated with the first RAT signaling exchanged between the neighboring devices on the first RAT based on the monitoring, and
        set one or more parameters of a Time Division Multiplexed (TDM) communication pattern based on the utilization metric and the beacon schedule; and
    a second transceiver configured in accordance with a second RAT and configured to cycle between activated periods and deactivated periods of communication over the medium in accordance with the TDM communication pattern,
    wherein the RAT signaling exchanged by the one or more other access terminals includes RAT signaling that is not directly detectable by the access point.

2. The access point of claim 1, wherein the one or more parameters comprise a start time parameter defining the activated periods of the TDM communication pattern, a stop time parameter defining the activated periods of the TDM communication pattern, a duration parameter defining the activated periods of the TDM communication pattern, a duty cycle parameter defining the activated periods of the TDM communication pattern, or a combination thereof.

3. The access point of claim 2, wherein the processor and memory are configured to set the one or more parameters to align the activated periods with time intervals between successive beacon signals in the beacon schedule.

4. The access point of claim 3, wherein the processor and memory are configured to set the one or more parameters based on an overlap between the activated periods and the beacon signals.

5. The access point of claim 1, wherein the processor and memory are configured to determine a beacon interval, a target beacon transmission time, or a combination thereof for the beacon schedule by reading one or more corresponding information fields present in beacon signals of the first RAT signaling.

6. The access point of claim 1, wherein the processor and memory are further configured to identify a first type of beacon and a second type of beacon associated with the beacon schedule, and wherein the processor and memory are further configured to set the one or more parameters to stagger the activated periods with beacon signals of the first type.

7. The access point of claim 6, wherein the first type of beacon corresponds to a beacon conveying a Delivery Traffic Indication Map (DTIM).

8. The access point of claim 6, wherein the processor and memory are further configured to set the one or more parameters to stagger the activated periods with the beacon signals of the first type while aligning the activated periods with beacon signals of the second type.

9. The access point of claim 1, wherein the first transceiver is further configured to receive beacon signal information from an access terminal, and wherein the processor and memory are configured to determine the beacon schedule based on the received beacon signal information.

10. The access point of claim 1, wherein the processor and memory are further configured to schedule transmission on a first frequency to align data traffic with time intervals between successive beacon signals in a first beacon schedule and on a second frequency to align the data traffic with time intervals between successive beacon signals in a second beacon schedule, wherein the first and second beacon schedules are staggered in time.

11. The access point of claim 1, wherein:
the medium comprises one or more time, frequency, or space resources on an unlicensed radio frequency band;
the first RAT comprises Wi-Fi technology; and
the second RAT comprises Long Term Evolution (LTE) technology.

12. A method for managing operation over a communication medium shared between Radio Access Technologies (RATs), comprising:
monitoring the medium, via a first transceiver of an access point configured in accordance with a first RAT, for first RAT signaling being exchanged between neighboring devices of the access point;
determining, by the access point, a utilization metric associated with utilization of the medium by the first RAT signaling;
determining, by the access point, a beacon schedule associated with the first RAT signaling exchanged between the neighboring devices on the first RAT based on the monitoring;
setting, by the access point, one or more parameters of a Time Division Multiplexed (TDM) communication pattern based on the utilization metric and the beacon schedule; and
cycling, via a second transceiver of the access point configured in accordance with a second RAT, between activated periods and deactivated periods of communication over the medium in accordance with the TDM communication pattern,
wherein the RAT signaling exchanged by the one or more other access terminals includes RAT signaling that is not directly detectable by the access point.

13. The method of claim 12, wherein the one or more parameters comprise a start time parameter defining the activated periods of the TDM communication pattern, a stop time parameter defining the activated periods of the TDM communication pattern, a duration parameter defining the activated periods of the TDM communication pattern, a duty cycle parameter defining the activated periods of the TDM communication pattern, or a combination thereof.

14. The method of claim 13, wherein the setting comprises setting the one or more parameters to align the activated periods with time intervals between successive beacon signals in the beacon schedule.

15. The method of claim 14, wherein the one or more parameters are set based on an overlap between the activated periods and the beacon signals.

16. The method of claim 12, wherein determining the beacon schedule comprises determining a beacon interval, a target beacon transmission time, or a combination thereof for the beacon schedule by reading one or more corresponding information fields present in beacon signals of the first RAT signaling.

17. The method of claim 12, further comprising identifying a first type of beacon and a second type of beacon associated with the beacon schedule, wherein the setting comprises setting the one or more parameters to stagger the activated periods with beacon signals of the first type.

18. The method of claim 17, wherein the first type of beacon corresponds to a beacon conveying a Delivery Traffic Indication Map (DTIM).

19. The method of claim 12, further comprising receiving beacon signal information from an access terminal, wherein the beacon schedule is determined based on the received beacon signal information.

20. The method of claim 12, further comprising scheduling transmission on a first frequency to align data traffic with time intervals between successive beacon signals in a first beacon schedule and on a second frequency to align the data traffic with time intervals between successive beacon signals in a second beacon schedule, wherein the first and second beacon schedules are staggered in time.

21. The method of claim 12, wherein:
the medium comprises one or more time, frequency, or space resources on an unlicensed radio frequency band;
the first RAT comprises Wi-Fi technology; and
the second RAT comprises Long Term Evolution (LTE) technology.

22. An access point for managing operation over a communication medium shared between Radio Access Technologies (RATs), comprising:
a first transceiver configured in accordance with a first RAT and configured to monitor the medium for first RAT signaling;
a processor and memory configured to:
determine a beacon schedule associated with the first RAT signaling based in part upon one or more first RAT measurement reports received from an access terminal, the one or more first RAT measurement reports including measurements of RAT signaling exchanged by one or more other access terminals, and
schedule subframe puncturing on the medium in accordance with a second RAT based on the beacon schedule; and
a second transceiver configured in accordance with the second RAT and configured to puncture transmission over the medium in accordance with the scheduled subframe puncturing,
wherein the RAT signaling exchanged by the one or more other access terminals includes RAT signaling that is not directly detectable by the access point.

23. The access point of claim 22, wherein the processor and memory are configured to schedule the subframe puncturing to align with beacon signals in the beacon schedule.

24. The access point of claim 22, wherein the processor and memory are configured to schedule the subframe puncturing for one or more subframes by:
  configuring the one or more subframes for data channel muting with respect to one or more corresponding symbol periods; and
  refraining from scheduling data during the one or more corresponding symbol periods.

25. The access point of claim 22, wherein the processor and memory are configured to schedule subframe puncturing for one or more subframes by:
  configuring the one or more subframes for broadcast channel operation to reserve one or more corresponding symbol periods for a multi-cell transmission; and
  refraining from transmitting during the one or more corresponding symbol periods.

26. The access point of claim 22, wherein the processor and memory are configured to schedule subframe puncturing for one or more subframes by:
  configuring the one or more subframes for Almost Blank Subframe (ABS) muting with respect to one or more corresponding symbol periods; and
  transmitting one or more control signals while omitting one or more other signals during the one or more corresponding symbol periods.

27. The access point of claim 22, wherein the first transceiver is further configured to receive beacon signal information from an access terminal, and wherein the processor and memory are configured to determine the beacon schedule based on the received beacon signal information.

28. The access point of claim 22, wherein:
  the medium comprises one or more time, frequency, or space resources on an unlicensed radio frequency band;
  the first RAT comprises Wi-Fi technology; and
  the second RAT comprises Long Term Evolution (LTE) technology.

29. A method for managing operation over a communication medium shared between Radio Access Technologies (RATs), comprising:
  monitoring the medium, via a first transceiver of an access point configured in accordance with a first RAT, for first RAT signaling;
  determining, by the access point, a beacon schedule associated with the first RAT signaling based in part upon one or more first RAT measurement reports received from an access terminal, the one or more first RAT measurement reports including measurements of RAT signaling exchanged by one or more other access terminals;
  scheduling, by the access point, subframe puncturing on the medium in accordance with a second RAT based on the beacon schedule; and
  puncturing, via a second transceiver of the access point configured in accordance with the second RAT, transmission over the medium in accordance with the scheduled subframe puncturing,
  wherein the RAT signaling exchanged by the one or more other access terminals includes RAT signaling that is not directly detectable by the access point.

30. The method of claim 29, wherein the scheduling comprises scheduling the subframe puncturing for one or more subframes by:
  configuring the one or more subframes for data channel muting with respect to one or more corresponding symbol periods, and refraining from scheduling data during the one or more corresponding symbol periods;
  configuring the one or more subframes for broadcast channel operation to reserve one or more corresponding symbol periods for a multi-cell transmission, and refraining from transmitting during the one or more corresponding symbol periods; or
  configuring the one or more subframes for Almost Blank Subframe (ABS) muting with respect to one or more corresponding symbol periods, and transmitting one or more control signals while omitting one or more other signals during the one or more corresponding symbol periods.

* * * * *